US010438432B2

(12) United States Patent
Espig

(10) Patent No.: US 10,438,432 B2
(45) Date of Patent: Oct. 8, 2019

(54) METHOD FOR TRANSFERRING TRANSPORT GOODS IN A LOCKABLE TRANSPORT CONTAINER, LOCKABLE TRANSPORT CONTAINER, AND TRANSPORT SYSTEM

(71) Applicant: SEs Solutions GmbH, Freital (DE)

(72) Inventor: Serle Espig, Hamburg (DE)

(73) Assignee: SES SOLUTIONS GMBH, Freital (DE)

( * ) Notice: Subject to any disclaimer, the term of this patent is extended or adjusted under 35 U.S.C. 154(b) by 0 days.

(21) Appl. No.: 14/778,173

(22) PCT Filed: Mar. 18, 2014

(86) PCT No.: PCT/EP2014/055433
§ 371 (c)(1),
(2) Date: Sep. 18, 2015

(87) PCT Pub. No.: WO2014/147082
PCT Pub. Date: Sep. 25, 2014

(65) Prior Publication Data
US 2016/0284149 A1    Sep. 29, 2016

(30) Foreign Application Priority Data
Mar. 18, 2013   (DE) .................. 10 2013 102 732

(51) Int. Cl.
*G07C 9/00* (2006.01)
*G06Q 10/08* (2012.01)

(52) U.S. Cl.
CPC ....... *G07C 9/00912* (2013.01); *G06Q 10/083* (2013.01); *G07C 9/00087* (2013.01);
(Continued)

(58) Field of Classification Search
CPC .......... G06Q 10/083; G07C 2009/0088; G07C 2009/0092; G07C 9/00087; G07C 9/00182; G07C 9/00896; G07C 9/00912
See application file for complete search history.

(56) References Cited

U.S. PATENT DOCUMENTS

| 2002/0121962 A1 | 9/2002 | Wolfe |
| 2006/0216966 A1* | 9/2006 | Selek .................. B60P 1/6418 439/76.2 |

(Continued)

FOREIGN PATENT DOCUMENTS

| DE | 102007042345 B3 * | 4/2009 | ............... B60R 5/00 |
| DE | 102007042345 B3 * | 4/2009 | ............... B60R 5/00 |

(Continued)

*Primary Examiner* — Sisay Yacob
(74) *Attorney, Agent, or Firm* — Porter Wright Morris & Arthur LLP

(57) ABSTRACT

The invention relates to a method for transferring transport goods from a sender (13) to a recipient (19) by means of a delivery agent, wherein the sender (13) places the transport goods into a lockable transport container (11), wherein the transport container (11) is locked by means of an electronic lock and a first electronic signal or a first code, wherein the locked transport container (11) is delivered to the recipient (19) by the delivery agent, wherein the electronic lock is opened by means of a second electronic signal or a second code in order for the recipient to remove the transport goods, said method providing increased flexibility, improved utilization of means of transport, and increased security.; According to the invention the first electronic signal or the first code is transmitted, in particular from a control center (10), to the sender (13) and/or to the electronic lock or the control center (10) opens the electronic lock by remote access upon request of the sender (13), and the second electronic signal or the second code is transmitted, in particular from the control center (10), to the recipient (19)

(Continued)

and/or to the electronic lock or the control center (10) opens the electronic lock by remote access upon request of the recipient (19).

19 Claims, 4 Drawing Sheets

(52) U.S. Cl.
CPC ..... *G07C 9/00182* (2013.01); *G07C 9/00896* (2013.01); *G07C 2009/0088* (2013.01); *G07C 2009/0092* (2013.01)

(56) References Cited

U.S. PATENT DOCUMENTS

| | | | | |
|---|---|---|---|---|
| 2007/0125100 | A1* | 6/2007 | Shoenfeld | E05B 47/0012 62/125 |
| 2009/0320538 | A1 | 12/2009 | Pellaton | |
| 2011/0055046 | A1* | 3/2011 | Bowen | G06Q 10/08 705/26.41 |
| 2012/0158606 | A1* | 6/2012 | Moudy | G06Q 10/083 705/332 |

FOREIGN PATENT DOCUMENTS

| | | |
|---|---|---|
| EP | 2146328 A2 | 1/2010 |
| WO | 2005/029374 A1 | 3/2005 |
| WO | 2013/011041 A2 | 1/2013 |

\* cited by examiner

METHOD FOR TRANSFERRING TRANSPORT GOODS IN A LOCKABLE TRANSPORT CONTAINER, LOCKABLE TRANSPORT CONTAINER, AND TRANSPORT SYSTEM

The invention relates to a method for transferring transport goods according to the preamble of claim 1, to a lockable transport container and to a transport system.

DESCRIPTION

When dispatching or transporting transport goods, for example when dispatching goods such as mail orders or when sending confidential documents, both the sender and the recipient have a higher interest in getting the transport goods at low cost and as quickly as possible to its destination, wherein at the same time it should be ensured that the transported goods are secured in the best possible manner against access by third parties. At the same time every day many private motor vehicles are in operation which are travelling from the sending location to the receiving location at exactly the same time that the transported goods are to be dispatched. Further, in the area of passenger transportation, so-called car-sharing agencies are known, which are to ensure a higher efficiency of private motor vehicles by finding passengers for motor vehicle owners to share the ride. However, the known concept of car-sharing agencies is not suitable for the dispatch of sensitive or confidential transport goods, as a third-party access to the transport goods, for example by the motor vehicle driver, cannot be precluded.

SUMMARY OF THE INVENTION: REQUIREMENT, SOLUTION, ADVANTAGES

The present invention is based on the requirement to propose a method for transferring transport goods from a sender to a recipient via a delivery agent, which provides improved flexibility, improved efficiency of transport means and improved security for a simultaneous shortening of transport times.

The requirement is met by a method according to the invention.

According to the invention, with a method for transferring transport goods from a sender to a recipient via a delivery agent, wherein the sender places the transport goods into a lockable transport container, wherein the transport container is locked by an electronic lock and a first electronic signal or a first code, wherein the locked transport container is delivered to the recipient by the delivery agent, wherein the electronic lock is opened by means of a second electronic signal or a second code in order for the recipient to remove the transport goods, provision is made for the first electronic signal or the first code to be transmitted in particular from a control centre to the sender and/or the electronic lock, or for the control centre to open the electronic lock by remote access upon request of the sender, and for the second electronic signal or the second code to be transmitted in particular from the control centre to the recipient and/or to the electronic lock or for the control centre to open the electronic lock by remote access upon request of the recipient.

Since, according to the invention, only the sender and/or the recipient is in possession of the electronic signal or the code for opening the electronic lock, access by unauthorised third parties to the transport goods can be advantageously prevented. With this arrangement it is also possible for the electronic lock to be opened or closed by remote access by the control centre upon authorised request of the sender or the recipient, so that also in this case unauthorised third-party access can be precluded. The first electronic signal or the first code can preferably be a different signal or a different code from the second electronic signal or the second code. However, the first electronic signal or the first code may match the second electronic signal or the second code. It is also possible that the first electronic signal or the first code is transmitted or exchanged between transport container and sender and/or that the second electronic signal or the second code is transmitted or exchanged between transport container and recipient, so that for example a public key encoding process may be used.

In a preferred further development of the method provision is made for the transport container to be suitable for transport with a motor vehicle, wherein the transport container is in particular a roof box or a closed partial volume of a roof box, which can be locked separately or independently from the roof box with an electronic lock, or wherein the transport container is a container which is integrated with the motor vehicle, in particular with a storage space such as a trunk of a motor vehicle.

By configuring the transport container as a roof box, private motor vehicles can be advantageously utilised for transporting the transport goods, which leads to increased flexibility of the method and to a more efficient use of the motor vehicle as well as to shorter transport times.

In a particularly preferred further development of the method provision is made for the electronic signal or the code to be exchanged via a remote communication system, in particular a mobile network, between the control centre and the sender and between the control centre and the recipient and/or between the control centre and the electronic lock, and/or in that the electronic signal or the code is newly created or generated for each transport operation, in particular for each locking and unlocking operation of the transport container, and/or in that the electronic signal or the code is created or generated by the control centre and transmitted to the lock of the transport container and/or to the recipient and/or to the sender.

Due to secure transmission of the electronic signal or the code by means of an existing mobile network, flexibility of the method can be further increased, in particular because sender and recipient are not tied to a fixed location.

A convenient further development of the method provides for the transport container to be opened with a master signal or a master code, and/or for the transport container to be able to be located or traced by locating and/or tracking services.

A master code offers the advantage of ensuring that even if the electronic signal or the code has been lost, the transport container can be opened. Further, it ensures that in an emergency the police or other institutions can be given access to the transport goods.

A preferred embodiment of the method is characterised in that the electronic signal or the code is a signal pair or a code pair, and/or in that the electronic signal or the code is a digitised fingerprint or a QR-code or a barcode or a numeric code, and/or in that the transport container comprises a receiving mechanism or a reading mechanism for the electronic signal or the code, and in that the code is preferably transmitted optically, in particular via a display of a mobile device to the reading mechanism of the transport container.

Conveniently the electronic signal or the code may further comprise biometric data. Also, it is preferably possible that the electronic signal or the code is an identity card and/or a scan or a photocopy of an identity card or that the electronic signal or the code is stored on an identity card or a storage device integrated with an identity card. In the present case the term identity card encompasses any personal identification means, in particular passports.

Advantageously optical transmission of a code can be carried out quickly and securely with an appropriately configured mobile device and an optical reading mechanism.

In an further convenient embodiment of the method provision is made for a transport container to be associated with a delivery agent, for the control centre to keep a list of data, in particular a data base, of potential delivery agents, wherein the data comprises in particular the current location of the transport container associated with the delivery agent, preferably at least one expected location of the transport container for a future time period, the transport volume of the transport container as well as status information, which indicates the availability of the transport container for a transport operation within a current or future time period, and wherein the data is updated, preferably at predefined intervals, automatically or by transmitting the data via the potential delivery agent to the control centre.

A particularly convenient further development of the method provides for the sender to transmit a transport request for transport goods, comprising a desired sending location, a desired receiving location and a desired transport time period to the control centre, for the control centre to reconcile the request data with the data of the potential delivery agents, for the control centre, in particular if the transport container is available and/or the sending location matches the current location of the transport container and the receiving location matches the expected location of the transport container within a future time period, to associate a delivery agent with the sender, for the control centre to transmit to the delivery agent and/or the sender a confirmation comprising a hand-over location and a hand-over time, and for the delivery agent to preferably transport the transport goods from the hand-over location to a receiving location.

By reconciling the request data with the data of potential delivery agents the control centre can advantageously associate the sender to a delivery agent in a spatially and time-wise optimal manner resulting in transport times being shortened.

A preferred further development of the method provides for the transport request and/or the confirmation to be sent and/or received by a mobile device, in particular a smartphone, wherein in particular the transport request and/or the confirmation is created or displayed by means of an application software for the mobile device, in particular a mobile application.

In a particularly preferred further development of the method, provision is made for the loading and unloading of the transport container to be carried out by an automated transshipment facility and/or for the transport container to be arranged on or in a motor vehicle or to be removed out of or from the motor vehicle by an automated loading facility.

Furthermore, the underlying problem of the invention is solved by a lockable transport container according to the invention.

The lockable transport container according to the invention, which in particular is adapted for an above-described method and including an electronic lock, is characterised in that the transport container is configured as a roof box for a motor vehicle or in that the transport container is configured as a lockable, closed partial volume of a roof box, or in that the transport container is configured as a container which can be integrated with a motor vehicle, in particular with an existing storage space such as a trunk of the motor vehicle.

However, it is also possible for the storage space or the trunk of the motor vehicle to represent the transport container as such, so that no separate transport container has to be arranged in the storage space or in the trunk of the motor vehicle. In this case therefore the lockable transport container is configured as a storage space or as the trunk of the motor vehicle.

A preferred realisation of the lockable transport container provides for the transport container to be configured so that it is or can be integrated with a wall, preferably a floor, of a storage space, in particular a trunk of a motor vehicle, and/or for the transport container to be fitted and/or arranged and/or recessed into the wall of the storage space, in such a way that it is aligned with and/or flush with the side of the wall facing the storage space, and in that the transport container can be removed and/or withdrawn from the wall.

A transport container which can be integrated with the wall of a storage space of a motor vehicle is particularly advantageous in that the transport container, if currently no transport goods are transported in it, can be arranged in a space-saving manner in the storage space or in the trunk of the motor vehicle. As such it is particularly convenient if the lockable transport container is recessed or can be recessed into the wall or the floor of the trunk of the motor vehicle. If the transport container is required for the secure transport of transport goods, in particular so that it is secured against access by third parties, it can be withdrawn from the wall or from the floor of the storage space or the trunk and thus be made accessible for filling it with the transport goods. An embodiment which for filling does not require withdrawal of the transport container from the wall is also feasible. When the transport operation is completed and the transport goods have been removed from the transport container, the transport container can again be recessed into the wall or the floor so that there is again a larger storage volume available for the transport of goods with lesser security requirements. It is also possible, of course, that the transport container, during transfer of transport goods arranged in the transport container, is recessed into the wall of the storage space or the trunk. In this case a further advantage consists in that the transport container can be fitted and/or recessed into the wall of the storage space such that it is aligned and/or flush with the side of the wall which faces the storage space. On the one hand, due to the aligned flush arrangement it is ensured that the transport container has no protruding corners or edges, thereby lessening the risk of objects or persons bumping against the corners or edges, and on the other hand, an aligned or flush arrangement of the transport container in the wall of the storage space ensures that the transport container is masked and not recognisable as such for unauthorised third parties, thereby permitting a further increase in secure transportation.

In an especially preferred embodiment provision is made for the transport container to be configured as a collapsible transport container, in particular as a collapsible roof box, wherein the transport container, preferably when in a folded up state, can be arranged so that it is aligned and/or flush with that side of the wall of the storage space which faces a storage space, and whereby by unfolding the transport container thereby enlarging the inner volume of the transport container, a lockable transport volume can be made available for the transport of transport goods.

A collapsible transport container, when in a collapsed state, advantageously requires very little space/volume, so that it can be carried along without having any major impact on the daily use of the motor vehicle or the storage space of a motor vehicle. If, moreover, the collapsible transport container can be arranged in a wall of the storage space, a major advantage results in that, when in a collapsed state, the transport container can be arranged so as to be aligned with or flush with that side of the wall of the storage space which faces the storage space. With such an arrangement in particular, the collapsed transport container takes up only a very small amount of the storage space, and in addition, the transport container, when appropriately constructed, can be arranged so as to be aligned or flush with the wall of the storage space in such a way that from the outside it is very difficult or impossible for third parties to detect the existence of the transport container. If the transport container is required for secure transportation of transport goods, the necessary transport volume can be provided by unfolding the transport container, in particular by unfolding it out from the wall of the storage space and into the storage space, thereby enlarging the inner volume of the transport container. It is, however, not mandatory for the lockable transport container to be arranged in the wall and/or the floor of a storage space of a motor vehicle. As such it is feasible in principle for the collapsible transport container to be constructed as part of a double-wall trunk cover and/or engine compartment cover. In other words the trunk cover or engine compartment cover of the motor vehicle is constructed of two superimposed components, wherein the first component forms the outer surface and the second component forms the surface facing the engine or the storage space of the trunk, and wherein these components are movable relative to each other by the provision of appropriate means, in particular hinges. With a transport container configured in this way the superior component forming the outer surface of the trunk cover or the engine compartment cover can be moved away from and withdrawn from the lower component thereby forming a transport volume. The first component and the second component can thus form a first wall part of the transport container and/or a second wall part of the transport container. Moreover further wall parts of the transport container can be braced and/or unfolded between the upper and lower components, ultimately resulting in the creation of a transport container for the secure transportation of transport goods. Moreover, it is feasible for such a transport container to be provided in the roof of a passenger compartment of a motor vehicle or in other favourable places such as in the doors of the motor vehicle.

When the collapsible transport container is configured as a collapsible roof box, the roof box may be integrated with the roof of a motor vehicle and comprise volume-changing mechanisms for changing the volume of the interior of the roof box.

In a preferred embodiment the volume-changing mechanisms comprise swivelling mechanisms. With the aid of the swivelling mechanisms individual or also several wall elements of the roof box and/or segments of wall elements of the roof box can be swivelled. As individual wall elements can be swivelled, it is possible, in particular, to collapse individual wall elements or to fold wall elements towards each other or segments of wall elements towards each other. Due to this swivelling of wall elements the roof box can be collapsed or folded and unfolded as required.

Particularly preferred embodiments of a collapsible roof box have been disclosed in the international application PCT/EP2012/064038 of the same applicant, which hereby are expressly included in the present application.

In an advantageous further development of the transport container provision is made for the transport container to comprise a receiving mechanism or a reading mechanism for an electronic signal or a code for opening and closing the electronic lock, wherein preferably the electronic signal or the code is a digital fingerprint or a QR-code or a barcode or a numeric code, wherein the code is preferably transmitted optically, in particular via a display of a mobile device, to the receiving mechanism or reading mechanism.

Conveniently the electronic signal or the code may further comprise biometric data. Also, it is preferably possible that the electronic signal or the code is an identity card and/or a scan or a photocopy of an identity card or that the electronic signal or the code is stored on an identity card or a storage device integrated with an identity card. In the present case the term identity card encompasses any personal identification means, in particular passports.

In a convenient further development of the transport container a display means, in particular a screen or a touch-sensitive screen is provided. A touch-sensitive screen of this kind is also called a touch-screen. The display means, in particular the screen, is preferably suited for the display of information. The information may, for example, include the registration number of a vehicle on which the transport container configured as a roof box is positioned, a registration number of the transport container and/or an "available" sign if the transport container is empty, or an "occupied" sign if the transport container is filled. Further a display means configured as a touch-screen may be configured for the input of a code. Thus advantageously by entering a code via the touch-screen, the electronic lock of the transport container can be closed and/or opened.

In a further preferred embodiment of the transport container, the transport container comprises at least one optical reading mechanism, for example at least one camera and/or a scanning device or a scanner. Especially preferably the transport container comprises at least two optical reading mechanisms, in particular at least two cameras.

Advantageously this makes it possible to identify the sender and/or the recipient and/or a third authorised person by means of biometric information gained from the image data of the camera. The biometric information may for example relate to the face of the person.

If advantageously at least two reading mechanisms or at least two cameras are provided, movements or gestures of persons, in particular of the sender and/or the recipient, can be recorded and evaluated. In particular the movements and gestures may be utilised for identifying the person, or for controlling the functions of the transport container.

The scanning device or the scanner may for example be configured as a fingerprint scanner and/or as an identity card scanner, thereby allowing senders and/or recipients to identify themselves at the transport container by a fingerprint and/or by a photocopy and/or by a scan of the identity card.

Preferably identification of the sender and/or the recipient may be effected by an identity card, or by data in a storage mechanism integrated with an identity card. Reading of the data or information stored on the identity card may be carried out by suitable means, for example by a card reader and/or a contact-free reading mechanism based, for example, on near-field-communication and/or RFID technology.

In a further convenient development of the transport container the electronic signal and/or the code can be represented by gestures. For example, the recipient and/or the sender can perform gestures, which are recorded by means of a camera integrated with the transport container. The gestures are evaluated by a processing mechanism or processing unit conveniently integrated with the transport container such as a roof box. If the gestures are executed correctly, the electronic lock of the transport container can be opened and/or closed. Further the gestures may be input via a contact-sensitive screen again resulting in the electronic lock of the transport container being opened and/or closed. It is also possible for the processing unit of the transport container to be integrated with a motor vehicle. Further it is conveniently possible for the processing unit to communicate with further processing units such as an onboard computer of a motor vehicle or a computer of a control centre.

In an especially preferred development of the transport container further functions of the transport container can be controlled by gestures, wherein the gestures are for example transmitted optically via a camera or by touching a touchscreen. The further functions of the transport container may for example be a menu control as well as the naming of the sending location and/or receiving location or a communication with a control centre. Further, the sending of messages or an internet access could be a further function of the transport container.

The display means may be configured as a touch-insensitive screen or a touch-sensitive screen. A touch-sensitive screen is also called a touch-screen. The screen or the touch-screen may be arranged on the transport container or be integrated with it. But it is not mandatory for the screen or touch-screen to be arranged on the transport container, rather the screen may be arranged instead in the motor vehicle or on the outside of the motor vehicle. Preferably, however, the screen or touch-screen is arranged in such a way that persons such as the sender and/or the recipient can observe the screen from outside the motor vehicle and/or can retrieve information from or enter information into it. Further the screen or touch-screen is configured to display information, which e.g. relates to the transport container or the transport goods. To this end the screen or touch-screen can preferably be connected in a signal-technical manner to the transport container and/or the processing unit of the transport container.

Packing instructions may also preferably be displayed on the screen or the touch-screen. Packing instructions may relate to the sequence in which objects should be stored in the transport container. For example, the packing instructions can be displayed to the sender and/or the recipient and for example include information that bulky objects or heavy objects should be placed at the bottom of the transport container, whilst light-weight or less bulky objects should be placed on top of the bulky or heavy objects.

If required, the packing instructions may comprise warnings such as a warning that the loaded objects or the transport goods are not fastened inside the transport container or that the objects or the transport goods comprise liquids or the like.

The display means or the screen may be used to display information relevant to the car in relation to the transport goods or the luggage. For example, this relevant information may comprise the available maximum weight with which the transport container may be loaded, and/or the available maximum volume. If the load to be placed into the transport container is a partial load, the available maximum weight or maximum volume can be based on the transport goods already in the transport container. In addition, the relevant information may also comprise for example the degree of shock absorption or vibrations of the transport container or already occurred vibrations or shocks of the transport container, so that the sender and/or the recipient is made aware of which maximum vibrations can occur or have occurred.

To this end a transducer configured to record vibrations is preferably provided, which especially preferably is arranged integrated with the transport container.

Preferably the driver of the vehicle in which the transport container is arranged can receive information via the screen or the touch-sensitive screen. This information may comprise, for example, the sending location and the date of dispatch and the receiving location and the date of receipt and, if required, a preferred transport route. Further, information regarding the sender and/or the recipient or further information relating to the transport may be displayed.

The screen or the touch-sensitive screen may also be used as a means for voice communication with the processing mechanism or processing unit of the transport container, and/or with the sender and/or recipient and/or with the control centre. To this end an acoustic transducer or acoustic sensor such as a microphone is provided. Furthermore, it is advantageous if voice recognition is provided. Voice recognition can preferably be carried out via the processing mechanism or processing unit of the transport container.

In a further preferred embodiment communication with the processing unit of the transport container and/or the sender and/or the recipient and/or the control centre may be effected via gesture control or gesture recognition. To this end a camera and/or a distance sensor is preferably provided, wherein the camera and/or the distance sensor are preferably integrated with the transport container. In addition, a gesture recognition is preferably provided, which is carried out by the processing unit of the transport container. The receiver and/or the sender can use gestures to communicate commands, instructions and information to the processing unit of the transport container. In case of a distance sensor, the gestures may for example comprise an approximation of the hand of the sender and/or of the recipient to the distance sensor.

In a further preferred development of the transport container, the transport container includes a printing device, in particular a printing device for printing a receipt.

By printing a receipt the recipient and/or the sender is conveniently able to document the use of the transport container.

A preferred embodiment of the transport container provides for the transport container to be loaded and/or unloaded by means of an automated transshipment facility, and/or for the transport container to be arranged on or in a motor vehicle or to be removed out of or from the motor vehicle by an automated loading facility.

Conveniently the method according to the invention for the transfer of transport goods from a sender to a recipient via a delivery agent can be carried out with the above-described transport container in each of the preferred embodiments and developments of the transport container.

Furthermore the requirement is met by providing a transport system.

With the transport system according to the invention, comprising a lockable transport container for a motor vehicle and a control centre, provision is made for the transport container to comprise an electronic lock and a receiving mechanism and/or a reading mechanism for an electronic signal and a code and a locating means, in particular a GPS system, wherein the transport container is associated with a potential delivery agent, wherein the control centre comprises an in particular electronic list of data of potential delivery agents, wherein the data comprises in particular the current location of the transport container associated with the delivery agent, preferably at least one expected location of the transport container for a future time period, the transport volume of the transport container as well as status information indicating the availability of the transport container for a transport operation within a current or future time period, wherein the control centre is configured to associate a delivery agent to the sender of a transport request directed to the control centre for the transport goods, including a sending location, a receiving location and a transport period, by reconciling the data of the list in the control centre with the transport request.

A preferred embodiment of the transport is characterised in that the control centre is configured to transmit a first electronic signal or a first code to the sender and/or to the electronic lock or to open the electronic lock by remote access upon request of the sender, and to transmit a second electronic signal or a second code to the recipient and/or the electronic lock or to open the electronic lock by remote access upon request of the recipient.

A further preferred further development of the transport system provides for the electronic signal or the code to be transmitted from the control centre to a mobile terminal, in particular a mobile device of the sender and/or the recipient, and/or for the electronic signal or the code to be transmitted from the mobile terminal to the reading mechanism of the transport container.

SHORT DESCRIPTION OF THE DRAWING

In the following an embodiment of the invention will be explained in detail with reference to the drawings, in which FIG. 1 shows a transport system according to the invention, FIG. 2 shows a transport container configured as a roof box.

BEST APPROACH FOR REALISING THE INVENTION

Figure 1:
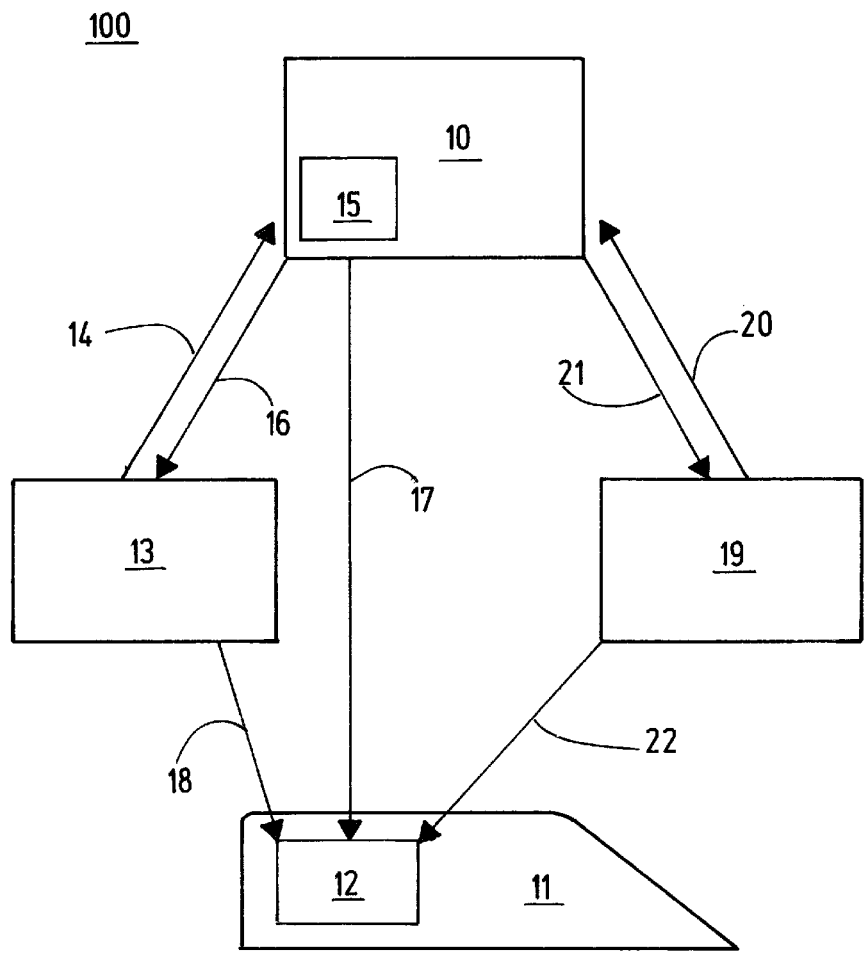

FIG. 1 is a purely schematic illustration of a transport system (100) according to the invention, comprising a control centre (10) and a lockable transport container (11) with a combined reading and receiving mechanism (12). The transport container (11) is configured as a roof box which can be mounted on a vehicle. A sender (13) sends a transport request (14) for transport goods comprising a desired sending location, a desired receiving location as well as a desired transport period to the control centre (10). The transport request (14) is created by the sender (13) with a mobile application of a mobile device such as a smartphone, and sent off. The control centre (10) reconciles the transport request (14) of the sender (13) with the data of potential delivery agents, which are stored in a data base (15). The data includes the current location of the transport container (11) associated with the delivery agent, the transport volume of the transport container (11) and a list of locations, at which the delivery agent will be and at which the transport container (11) associated with the delivery agent will be at a future point in time. When the control centre (10) finds a data record of a delivery agent, where in particular the current location matches the desired sending location and one of the future locations matches the desired receiving location, and wherein, at the same time, the desired transport period agrees with the points in time of the current and the future locations, the control centre (10) associates the delivery agent, to which the data record belongs, with the sender (13) and transmits to the sender (13) and the delivery agent the transport data for the transport goods, i.e. in particular the sending location, the receiving location and the transport period. Further the control centre (10) transmits (16) to the sender (13), to his mobile device, a code configured as a QR-code. In parallel thereto, the control centre (10), with the aid of a respective electronic signal (17) which is transmitted to the reading mechanism (12) of the transport container (11), releases the transport container (11) for the QR-code of the sender (13). The sender (13) transmits (18) the QR-code to an optical sensor of the reading mechanism (12), causing the lock of the transport container to be opened, and enabling the sender (13) to place the transport goods into the transport container (11). After closing the transport container (11), the delivery agent conveys the transport container (11) to the recipient (19). The recipient (19), using his mobile device, sends a receipt (20) to the control centre (10), whereupon the control centre (10), having determined that the recipient is authorised to receive the goods, transmits (21) to the recipient (19) a QR-code for opening the transport container (11). The recipient (19) transmits (22) the QR-code to the reading mechanism (12), whereupon the transport container (11) can be opened, and the recipient (19) can remove the transport goods from the transport container (11).

Figure 2:
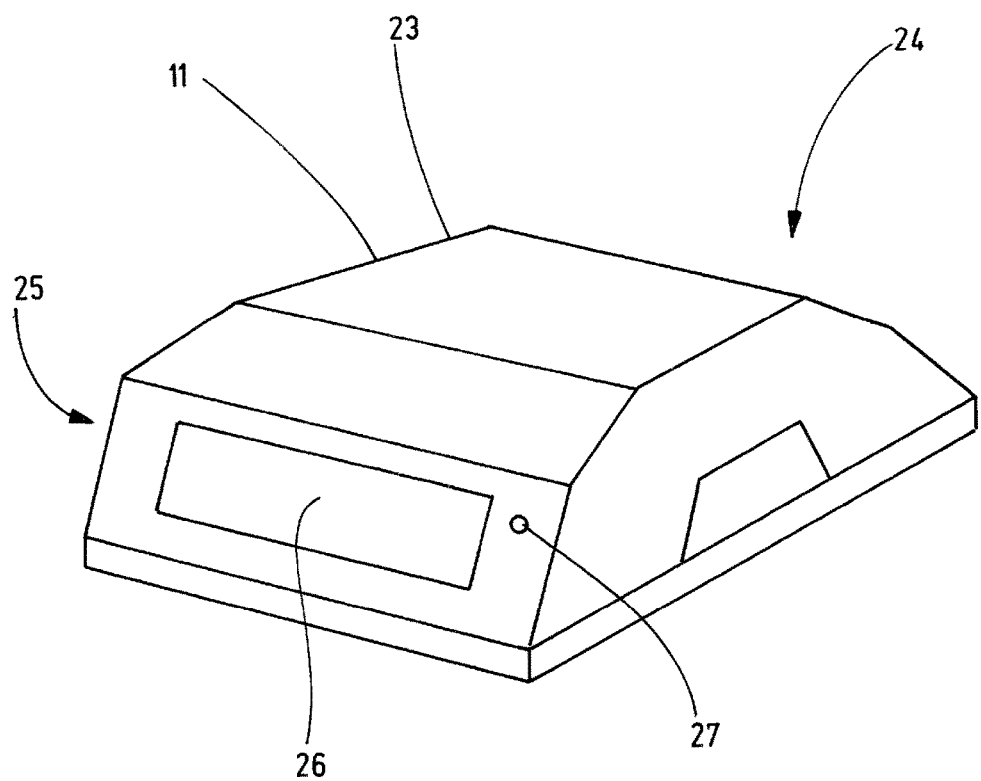

FIG. 2, in a schematic view, shows a transport container (11), which is suitable for use with the above-described transport system (100). The transport container (11) is configured as a roof box (23). In the embodiment shown the roof box (23) is configured as a collapsible roof box (23). The roof box (23) comprises a front side (24) and a rear side (25). A display means configured as a touch-screen (26) is arranged on the rear side (25) of the roof box (23). The touch-screen (26) is used, for example, to display a vehicle registration number or to input an electronic signal and/or a code for opening or closing the electronic lock of the roof box (23). Moreover, a camera (27) is integrated with the rear side (25) of the roof box (23). The recipient (19) or the sender (13) can open and/or close the roof box (23)/the electronic lock of the roof box (23) via the camera (27) by means of gesture control. Moreover, the camera (27) may be used for determining biometric data such as e.g. the facial geometry of a sender (13) or a recipient (19). Further, it is possible for the camera (27) to be used to scan an identity card and thereby identify the sender (13) and/or the recipient (19).

Figure 3:
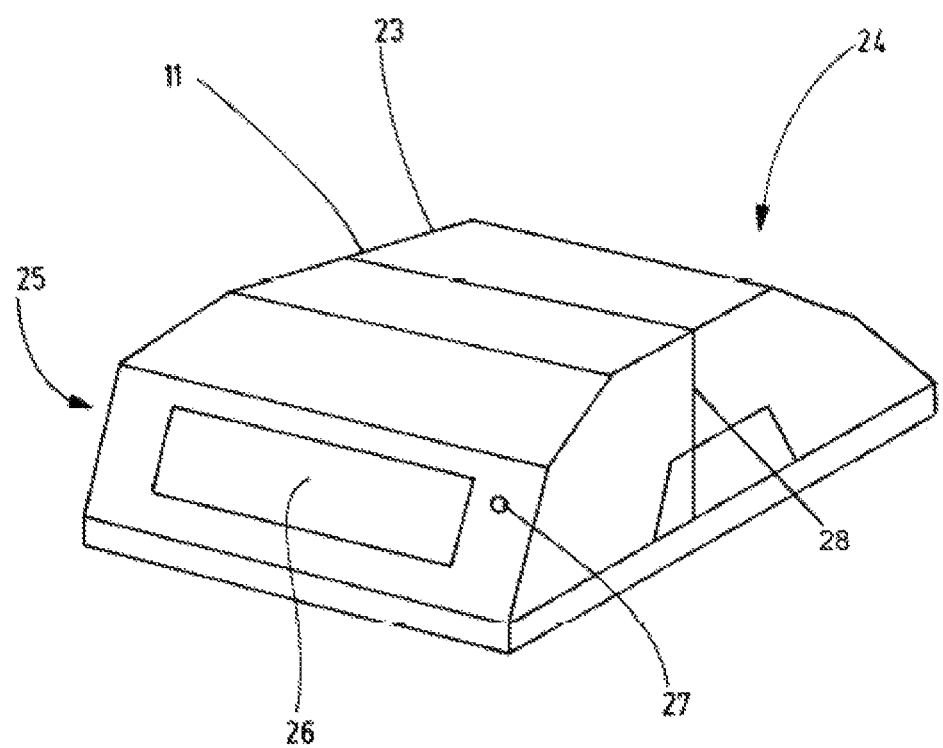
Fig. 3 shows a transport container configured as a lockable closed partial volume of a roof box.
Figure 4:
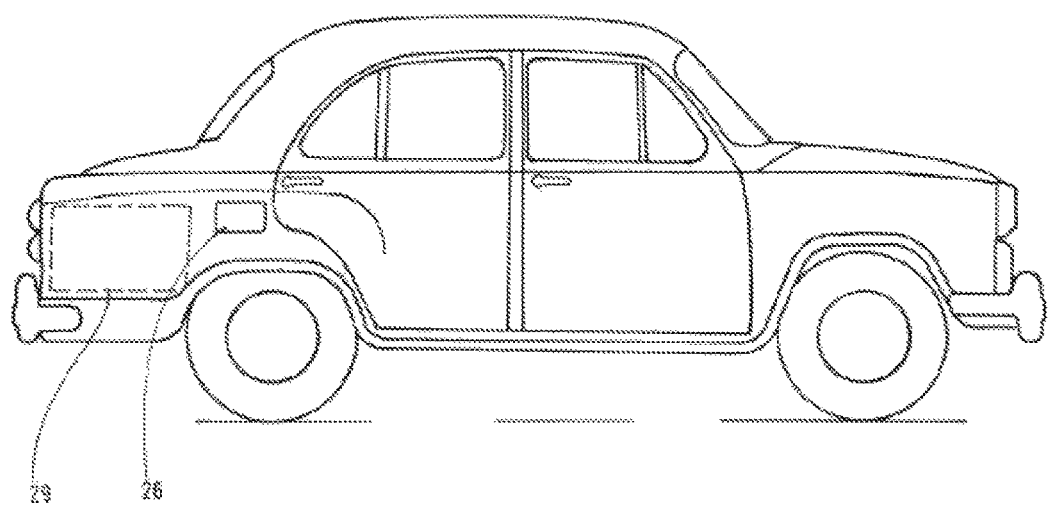
FIG. 4 shows a transport container configured as a lockable container integrated in a trunk.

FIG. 3 shows a roof box similar to that of FIG. 2, wherein the transport container is in the form of lockable closed partial volume of the roof box. Thus, the roof box in FIG. 3 additionally comprises a separation wall 28, so as to divide the roof box into two partial volumes, the left of which is the lockable closed partial volume of the roof box as described above. FIG. 4 shows a motor vehicle in the form of a car, from a side view, wherein the transport container is in the form of a lockable container 29 integrated in the trunk of the car, as described above, and is indicated with broken lines and reference numeral 29. The touch screen 26 as described in FIG. 2 is also shown.

LIST OF REFERENCE SYMBOLS

100 transport system
10 control centre
11 transport container
12 combined reading and receiving mechanism
13 sender 14 transport request
15 data base
16 transmission of the QR-code from the control centre to the sender
17 electronic signal to transport container
18 transmission of the QR-code from the sender to the reading means
19 recipient
20 receipt
21 transmission of the QR-code from the control centre to the recipient
22 transmission of the QR-code from the recipient to the reading means
23 roof box
24 front side
25 rear side
26 touch-screen
27 camera

The invention claimed is:

1. A method for transferring transport goods from a sender to a recipient via a delivery agent, the method comprising sending a first electronic signal or a first code via a mobile network from a control centre to the sender or, upon request from the sender, to an electronic lock of a lockable transport container of the delivery agent in which transport goods will be placed to allow opening of the electronic lock, wherein the lockable transport container is a roof box of a private automobile, a closed partial volume of a roof box of a private automobile, or a transport container integrated in a trunk of a private automobile or motorcycle, and, sending a second electronic signal or a second code via the mobile network from the control centre to the recipient or, upon request of the recipient, to the electronic lock, to allow opening of the lockable transport container and removal of the transport goods from the lockable transport container by the recipient once the lockable transport container has been delivered to the recipient by the delivery agent.

2. The method according to claim 1, wherein the first and second electronic signals or the first and second codes are newly created or generated for each locking and unlocking operation of the transport container, and/or wherein the first and second electronic signals or the first and second codes are created or generated by the control centre.

3. The method according to claim 1, wherein the transport container can be opened with a master signal or a master code, and/or wherein the transport container can be located or tracked by locating and/or tracking services.

4. The method according to claim 1, wherein each of the first and second electronic signals or the first and second codes is a signal pair or a code pair, and/or wherein each of the first and second electronic signals or the first and second codes is a digitised fingerprint or a quick response (QR)-code or a barcode or a numeric code, and/or wherein the transport container includes a receiving mechanism or a reading mechanism for the first and second electronic signals or the first and second codes and the first and second electronic signals or the first and second codes are transmitted optically, via a display of a mobile device, to the receiving mechanism or reading mechanism of the transport container.

5. The method according to claim 1, wherein each of the first and second electronic signals or the first and second codes comprises biometric data, wherein each of the first and second electronic signals or the first and second codes is an identity card or a scan or a photocopy of an identity card, or wherein each of the first and second electronic signals or the first and second codes is stored on an identity card or on a storage device integrated with the identity card.

6. The method according to claim 1, wherein the transport container is associated with the delivery agent, wherein data in the data base comprises a current location of the transport container associated with the delivery agent, at least one expected location of the transport container for a future time period, the transport volume of the transport container and status information which indicates the availability of the transport container for a transport operation within a current or future time period, and wherein the data is updated, automatically or by transmitting the data via the delivery agent to the control centre.

7. The method according to claim 6, wherein the data is updated at predefined intervals.

8. The method according to claim 6, wherein the control centre keeps a data base of a plurality of delivery agents associated with a plurality of the transport containers, respectively, and the data base comprises the data for each of the plurality of transport containers.

9. The method according to claim 8, wherein the control centre receives from the sender a transport request for transport of goods comprising a desired sending location, a desired receiving location and a desired transport time period, wherein the control centre reconciles the request data with the data of the plurality of delivery agents, wherein the control centre, if the transport container is available and/or if the sending location matches the current location of the transport container and the receiving location matches an expected location of the transport container in a future time period, associates a delivery agent with the sender, wherein the control centre transmits to the delivery agent and/or the sender a confirmation comprising a hand-over location and a hand-over time for the delivery agent to transport the transport goods from the hand-over location to the receiving location.

10. The method according to claim 9, wherein the transport request and/or the confirmation is sent and/or received by a smartphone, and wherein the transport request and/or the confirmation is created or displayed by means of a mobile application.

11. The method according to claim 1, wherein loading and unloading of the transport container is carried out by an automated transshipment facility, and/or wherein the transport container is arranged on or in the automobile or motorcycle or removed out of or from the automobile or motorcycle by an automated loading facility.

12. A lockable transport container, comprising a transport container selected from a roof box of a private automobile, a lockable, closed partial volume of a roof box of a private automobile, and a container integrated in a trunk of a private automobile or motorcycle, and an electronic lock for the transport container, wherein the electronic lock is configured to receive first and second electronic signals or codes in order to lock and unlock the transport container, respectively.

13. The lockable transport container according to claim 12, wherein the transport container is integrated in a wall of a trunk of the automobile or motorcycle and wherein the transport container can be fitted and/or arranged and/or recessed into the wall so that it is aligned with or flush with the wall, and wherein the transport container can be removed and/or withdrawn from the wall.

14. The lockable transport container according to claim 12, wherein the transport container is a collapsible roof box of an automobile.

15. The lockable transport container according to claim 12, wherein the transport container includes a receiving mechanism or a reading mechanism for the first and second electronic signals or codes for opening and closing the electronic lock, wherein each of the first and second electronic signals or codes is a digitised fingerprint or a quick response (QR)-code or a barcode or a numeric code, and wherein the first and second electronic signals or codes are transmitted optically, via a display of a mobile device, to the receiving mechanism or the reading mechanism.

16. The lockable transport container according to claim 12, wherein the transport container comprises a display screen or a touch-sensitive screen, and/or at least one camera, and/or a scanning device or a scanner, and/or a printing device for printing a receipt, and/or wherein the transport container comprises a processing unit, and wherein functions of the transport container can be controlled by gesture control, wherein gestures of a sender and/or of a recipient can be recorded by a camera and can be evaluated by the processing unit, and/or wherein voice communication with the processing unit of the transport container and/or the sender and/or the recipient and/or the control centre is provided.

17. The lockable transport container according to claim 12, wherein the transport container is configured for loading or unloading by an automated transshipment facility, and/or wherein the transport container is configured for arrangement by an automated loading facility on or in the automobile or motorcycle or is configured for removal by the same from or out of the automobile or motorcycle.

18. A transport system comprising a plurality of lockable transport containers, each associated with a respective private motor vehicle, wherein each private motor vehicle is an automobile or a motorcycle, each of said plurality of lockable transport containers being selected from a roof box of a private automobile, a lockable, closed partial volume of a roof box of a private automobile, and a container integrated in a trunk of a private motor vehicle, and a control centre, wherein each lockable transport container comprises an electronic lock and a receiving mechanism and/or a reading mechanism for an electronic signal or a code and a locating GPS-system, wherein each lockable transport container is associated with a respective delivery agent, wherein the control centre comprises an electronic list of data of the delivery agents, wherein the data comprises the current location of each lockable transport container associated with the respective delivery agent, at least an expected location of each lockable transport container for a future time period, the transport volume of each lockable transport container, and status information which indicates the availability of each lockable transport container for a transport operation within a current or future time period, wherein the control centre is configured to associate one of the delivery agents to a sender of a transport request directed to the control centre for a good to be transported, including a sending location, a receiving location and a transport period, by reconciling the data of the list of the control centre with the transport request, and wherein the control centre is configured to transmit a first electronic signal or a first code to the sender and/or to the electronic lock or to open the electronic lock by remote access upon request of the sender, and to transmit a second electronic signal or a second code to a recipient and/or the electronic lock or to open the electronic lock by remote access upon request of the recipient.

19. The transport system according to claim 18, wherein the control centre is configured to transmit the first and second electronic signals or first and second codes from the control centre to a mobile device of the sender and/or the recipient, and/or wherein the first and second electronic signals or first and second codes can be transmitted from the mobile device of the sender and/or the recipient to the reading mechanism of the lockable transport container.

* * * * *

UNITED STATES PATENT AND TRADEMARK OFFICE
CERTIFICATE OF CORRECTION

PATENT NO. : 10,438,432 B2  
APPLICATION NO. : 14/778173  
DATED : October 8, 2019  
INVENTOR(S) : Serle Espig Page 1 of 1

It is certified that error appears in the above-identified patent and that said Letters Patent is hereby corrected as shown below:

On the Title Page

Item (30), change "10 2013 102 732" to --10 2013 102 732.6--.

Signed and Sealed this  
Seventh Day of January, 2020

Andrei Iancu  
*Director of the United States Patent and Trademark Office*